United States Patent [19]

Christopher et al.

[11] Patent Number: 4,605,962

[45] Date of Patent: Aug. 12, 1986

[54] PROGRESSIVE SCAN TELEVISION SYSTEM WITH VIDEO COMPRESSION EXCEEDING DISPLAY LINE RATE

[75] Inventors: Todd J. Christopher, Indianapolis; Russell T. Fling, Fishers, both of Ind.

[73] Assignee: RCA Corporation, Princeton, N.J.

[21] Appl. No.: 676,946

[22] Filed: Nov. 30, 1984

[51] Int. Cl.$^4$ ............................................... H04N 7/01
[52] U.S. Cl. ..................... 358/140; 358/138
[58] Field of Search .................. 358/140, 11, 138

[56] References Cited

U.S. PATENT DOCUMENTS

| 4,322,750 | 3/1982 | Lord | 358/140 |
|---|---|---|---|
| 4,400,719 | 8/1983 | Powers | 358/140 |
| 4,415,931 | 11/1983 | Dischert | 358/242 |
| 4,426,661 | 1/1984 | Okada | 358/140 |
| 4,509,071 | 4/1985 | Fujimura et al. | 358/11 |
| 4,550,335 | 10/1985 | Powers | 358/11 |

FOREIGN PATENT DOCUMENTS 1391434 4/1975 United Kingdom.
2100092 12/1982 United Kingdom.
2111343 6/1983 United Kingdom.

*Primary Examiner*—Howard W. Britton
*Attorney, Agent, or Firm*—P. J. Rasmussen; P. M. Emanuel; R. G. Coalter

[57] ABSTRACT

A television receiver/monitor includes a progressive scan processor including memories for time compressing a video input signal and doubling the line rate to reduce visible line structure when the double line-rate signal is displayed. The memories are controlled to provide a video compression factor (2.5:1) greater than the display line rate increase (2:1) to provide a display retrace time (10.8 micro-seconds) substantially equal to the blanking interval (11.0 micro-seconds) of the video input signal thereby decreasing display power losses and horizontal drive requirements.

4 Claims, 6 Drawing Figures

PROGRESSIVE SCAN TELEVISION SYSTEM WITH VIDEO COMPRESSION EXCEEDING DISPLAY LINE RATE

FIELD OF THE INVENTION

This invention relates to "progressive scan" television receivers or monitors of the type that convert standard line-rate interlaced video signals into a higher line-rate non-interlaced form for display.

BACKGROUND OF THE INVENTION

Progressively scanned television receivers and monitors have been proposed wherein the horizontal scan rate is multiplied, e.g., doubled, and for each line of incoming video a number, e.g., two, of lines (being either replicated or interpolated from incoming video lines) are displayed thereby providing a displayed image having reduced visibility of line structure.

In a typical progressively scanned receiver, wherein the added lines are replicas of the incoming video lines, each line of video is stored in one of two memories. As a first of the memories is being written with the incoming video signal at a standard line rate, the second of the memories is read two times at twice the standard line rate thereby providing two lines of "speed-up" (time-compressed) video within one standard line interval. The second memory output is applied to a display having a doubled horizontal sweep rate synchronized with read-out of the memory thereby doubling the number of displayed lines of video signal. An example of such a progressively scanned receiver is described in U.S. Pat. No. 4,415,931 entitled TELEVISION DISPLAY WITH DOUBLED HORIZONTAL LINES which issued Nov. 15, 1983 to R. A. Dischert.

It has been recognized that a desirable reduction of certain artifacts (e.g., inter-line flicker, line break-up with motion, etc.) may be obtained in a progressively scanned receiver by interpolating the added lines of the video signal from the original signal. This may be done either before or after "speed-up" (i.e., time compressing) of the video signal in the memory. An example of a progressively scanned display system in which the additional scan lines are obtained by interpolation from the original scan lines prior to time compression or video "speed-up" is described by K. H. Powers in U.S. Pat. No. 4,400,719 entitled TELEVISION DISPLAY SYSTEM WITH REDUCED LINE SCAN ARTIFACTS which issued Aug. 23, 1983. An alternative of providing interpolation subsequent to speed-up of the video signal is described by Yasushi Fujimura et al. in UK Patent Application No. 2,111,343A published June 29, 1983.

It has been further recognized that additional reduction of visible artifacts may be obtained in a progressively scanned receiver by using combination of line stores and field or frame stores to provide video time compression. An arrangement in which the field rate is doubled and the number of lines per field is also doubled is described by Lord et al. in U.S. Pat. No. 4,322,750 entitled TELEVISION DISPLAY SYSTEM which issued Mar. 30, 1982.

In such "line" or "field" or "frame" types of progressive scan systems the horizontal sweep rate is increased by the same "speed-up" factor (e.g., 2:1 or 4:1) as the video signal. For example, if the line rate is doubled or quadrupled in the video processor for display, then the horizontal sweep rate must also be doubled or quadrupled. This undesirably reduces the horizontal retrace time. The effects of the reduction in retrace time are numerous. In a double scanning system, for example, the deflection supply voltage for a given yoke winding must also be doubled to produce the required change in yoke current. The peak retrace voltage will also be doubled as all deflection voltage waveforms are increased by a given factor in amplitude and compressed in time by the same factor. Thus, the turn-off power losses in the horizontal output transistor are increased by a factor of eight. The reduced turn-off time and doubled voltage cause the rate of voltage rise (dv/dt) at turn-off to be four times greater. The energy lost per turn-off event is thus four times normal and the rate of turn-off events is twice normal resulting in an eight fold increase in the turn-off power loss. If one were to attempt to solve this problem by reducing the yoke impedance by a factor of four, the yoke voltages would be normal but the currents would be doubled. Power losses are unchanged by such impedance scaling.

SUMMARY OF THE INVENTION

In accordance with the invention, the burden on the deflection system of a line, field or frame type progressive scan receiver (or monitor) may be substantially reduced by time compressing the video signal to be displayed by a factor which exceeds the display line rate.

A television system, in accordance with the invention, includes a source for providing a video input signal having a given line rate. A processor means, coupled to the source, time compresses the video input signal by a factor K and increases the line rate of the time compressed signal by a different factor N, K being greater than N, to provide a processed video output signal. A display means, having a horizontal sweep rate equal to N-times the given line rate, is coupled to the processor means for displaying the processed video output signal.

In a preferred application of the principles of the invention, the video input signal is of digital form having a given data rate and a given clock rate and means are provided for effectively changing the data rate without altering the clock rate.

DETAILED DESCRIPTION

The principles of the invention may be applied to progressive scan systems of the type employing line stores, field stores, frame stores or combination of such memories for increasing the number of displayed lines of a standard video signal such as NTSC, PAL or SECAM formated signals. In such systems, deflection power requirements are reduced when the video signal is compressed in accordance with the invention by a factor greater than the display line rate. In the specific system of FIG. 1, an additional benefit is that the video compression factors are controlled in such a manner that memory storage requirements are reduced and memory clock signals are related by integers even though the compression factor is a non-integer. This latter feature of this specific example of the invention greatly simplifies read-write clock signal generation.

Figure 1:
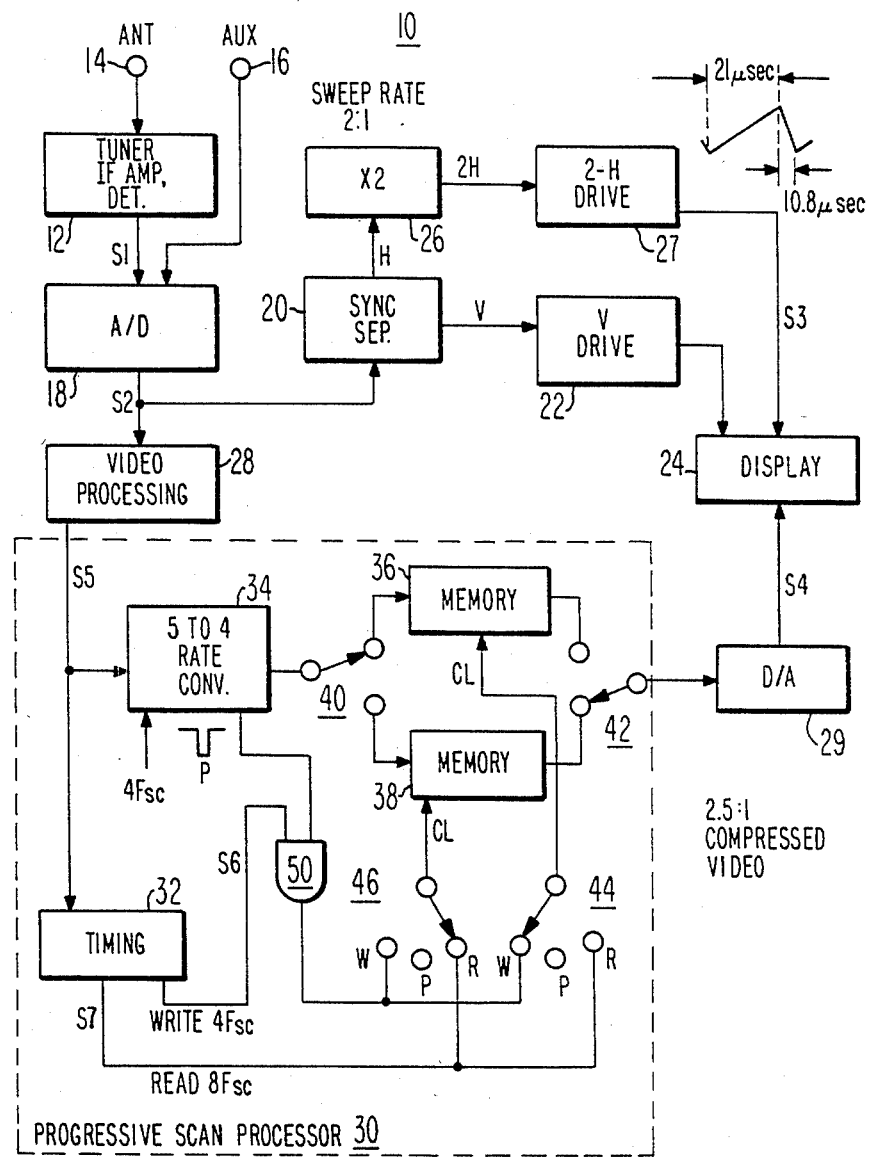
FIG. 1 is a block diagram of a progressive scan television receiver/monitor embodying the invention.
Figure 2:
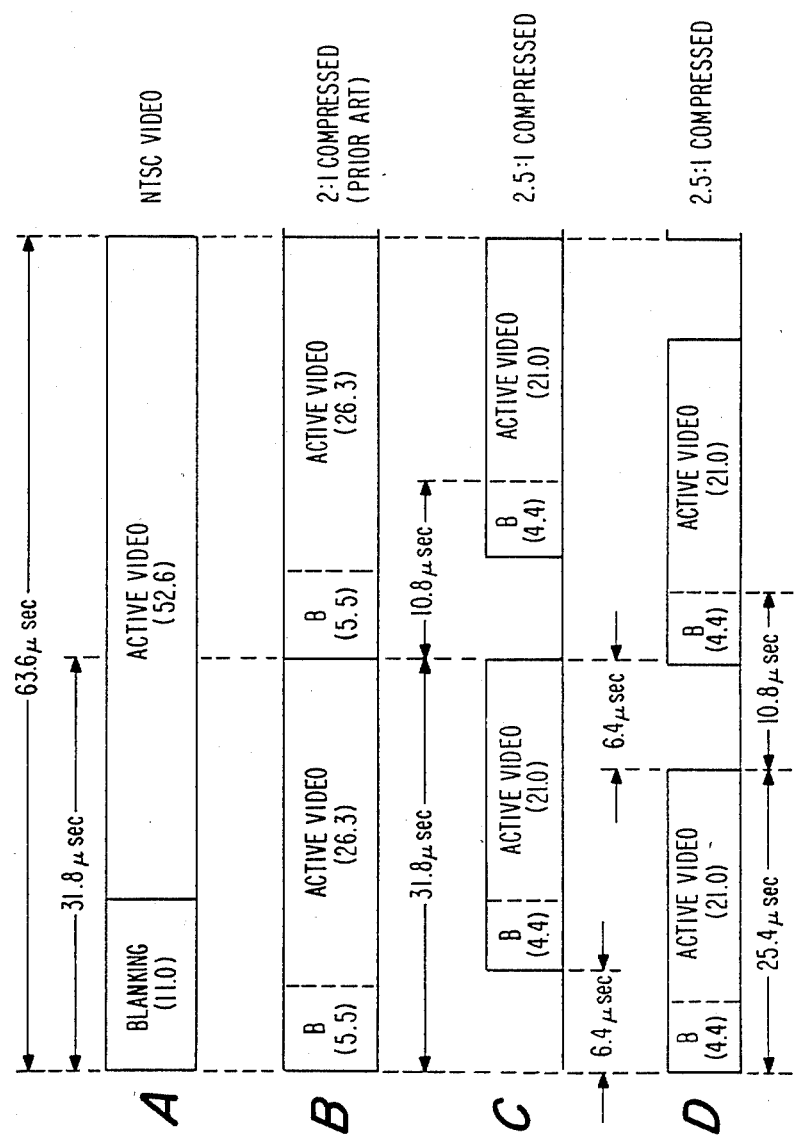
FIGS. 2, 3 and 4 are timing and waveform diagrams illustrating operation of the receiver/monitor of FIG. 1.

The receiver/monitor 10 (hereinafter "receiver") of FIG. 1 is of the so-called "line pro-scan" type which employs one-line memories for speeding up (time compressing) a video signal for display. For purposes of illustration it will be assumed that the video signal is of the NTSC format in which the line length is about 63.6 micro-seconds comprising 52.6 micro-seconds of "active video" (i.e., the picture information to be displayed) and 11.0 micro-seconds of blanking time which conveys the horizontal synchronizing and color burst reference signals. This standard format is illustrated in FIG. 2 by timing diagram A.

Receiver 10 includes a tuner, IF amplifier, detector unit 12 of conventional design having an antenna input terminal (ANT) 14 for connection to a source of RF modulated video signal and having an output for providing a baseband video output signal S1. The baseband signal S1, alternatively, may be provided by a source coupled to auxilliary (AUX) input terminal 16. Unit 12 may be eliminated for "monitor only" applications.

The baseband signal S1 from unit 12 or terminal 16 is applied to an analog-to-digital converter 18 of conventional design (e.g., an eight-bit video "flash" converter) for conversion to digital form as signal S2. Conversion to digital form is advantageous because, in this example of the invention, it facilitates a subsequent binary rate conversion for reducing random access memory (RAM) storage requirements and simplifies the memory clock requirements. If these features of the invention are not desired in a specific application, then converter 18 may be eliminated and the video time compression may be provided by means of a quasi-digital or sampled data form of clocked memory such as a CCD (charge coupled device) memory.

The digitized video signal S2 is applied to a digital sync separator unit 20 which separates the horizontal (H) and vertical (V) synchronizing components of signal S2. Alternatively, separator 20 may be of the analog type in which case the analog signal S1 would be applied to its input rather than the digital signal S2. The vertical synchronizing component (e.g., 60 Hz for monochrome NTSC video or 59.94 Hz for color) is applied via a conventional vertical drive unit 22 to the vertical deflection coils of a conventional display unit 24 which, illustratively, may comprise a kinescope or a projection type device. The hoizontal synchronizing component (H) is applied to a frequency doubler 26 which doubles the horizontal line frequency to provide a double line rate (2H) horizontal sync signal to a drive unit 27 which, in turn, generates a double line rate horizontal sweep signal, S3, for display unit 24. Since the vertical sweep rate corresponds to the NTSC standard and the line rate has been doubled, display unit 24 produces a double line scan raster, that is, a raster having 525 lines per field rather than 262.5. The line rate of the video signal S2 is also doubled (i.e., twice the incoming video line rate, and the resultant double line rate video signal S4 is applied to unit 24 thereby providing a displayed image having 525 lines per field with reduced visibility of line structure.

In a conventional progressive scan receiver, drive unit 27 would normally be adjusted to provide a double line rate horizontal drive signal to the yoke of display unit 24 having sweep and retrace intervals of 26.3 and 5.5 micro-seconds, respectively, FIG. 2 (waveform B) illustrates that the active video interval (26.3 micro-seconds) and blanking interval (5.5 micro-seconds) of the conventional double line rate video signal are exactly one-half that of the standard NTSC values (52.6 and 11.0 micro-seconds, respectively). It is a feature of the present invention that drive unit 26 may be adjusted so as to provide a retrace (blanking) interval that is substantially equal to that of the normal line rate video input signal S1.

In accordance with the present invention, the video signal is compressed by a factor which exceeds the increased line rate. For this example, the video is compressed by 2.5:1 while the line rate is increased by the factor 2:1. As a result, the amount of time available for horizontal retrace is 10.8 micro-seconds as illustrated by diagrams C and D of FIG. 2. Deflection requirements are thus greatly eased since the more greatly compressed active scan time allows two compressed active scans and two standard retrace times in one standard time interval. For a given standard deflection yoke in unit 24, the supply voltage would be 2.5 times normal (rather than doubled) but the peak retrace voltage across the yoke and the rate of rise of voltage (dV/dt) at the start of retrace is the same as in a standard (non-proscan) system. The change from 2:1 compression (standard pro-scan) to 2.5:1 compression reduces turn-off losses by a factor of four and the peak retrace voltage on the horizontal output device is substantially less than would result if only 5.5 micro-seconds were available for retrace.

To summarize the foregoing, as shown in FIG. 2, a standard line of NTSC video comprises 52.6 micro-seconds of active video and 11 micro-seconds of retrace (blanking) time. In a standard line doubling pro-scan system the display line interval is 31.8 micro-seconds comprising 26.3 micro-seconds of active video and 5.5 micro-seconds of retrace time. By compressing the video according to the invention by 2.5:1 (for NTSC format signals) one line will occupy 25.4 micro-seconds of which 4.4 micro-seconds is available for blanking. The total of 4.4 micro-seconds from the 2.5:1 compressed line and the 6.4 micro-seconds remaining of the 31.8 micro-seconds in the one-half normal line interval equals 10.8 micro-seconds which is 98 percent of the standard NTSC retrace interval of 11.0 micro-seconds. Other video compression factors could be used. However, as will be shown, the factor 2.5:1 is optimum for NTSC signals in a double scanning (2:1 line rate increase) system.

The video signal S2 is compressed in the receiver of FIG. 1 by means of a progressive scan processor 30 having an input coupled via a video processing unit 28 to the output of converter 18 and an output coupled to display unit 24 via a digital-to-analog converter (D/A) 29. Unit 28 is of conventional design and provides such functions as chroma-luma separation, flesh-tone correction, peaking, etc. To simplify the drawing, chroma processing is not shown, however, the chroma signal (if processed separately from the luma signal) may be compressed by a factor of 2.5:1 in a processor similar to processor 30 and then appropriately matrixed with luma to provide appropriate drive signals for display unit 24.

In processor 30 the video signal S5 provided by unit 28 is applied to a timing unit 32 and to a five-to-four (5:4) data rate converter 34. Unit 32 comprises conventional counters, decoders and burst locked loops for generating various timing signals including a WRITE clock signal S6 having a frequency equal to four-times the color subcarrier frequency (4Fsc) and a READ clock signal S7 having a frequency equal to eight-times the color subcarrier frequency (8Fsc) of the video signal S5.

The 4Fsc clock signal S6 is applied via a conductor (not shown) to A/D converter 18 for controlling the conversion (sampling) rate of video signal S1. Accordingly, data rate of signal S5 correspondes to the write clock rate or about $14.3 \times 10^6$ words per second where each (eight-bit) word represents one "pixel" (picture element) of signal S5. For convenience, data (word) rates hereinafter are expressed in terms of mega-Hertz (MHz).

Figure 4:
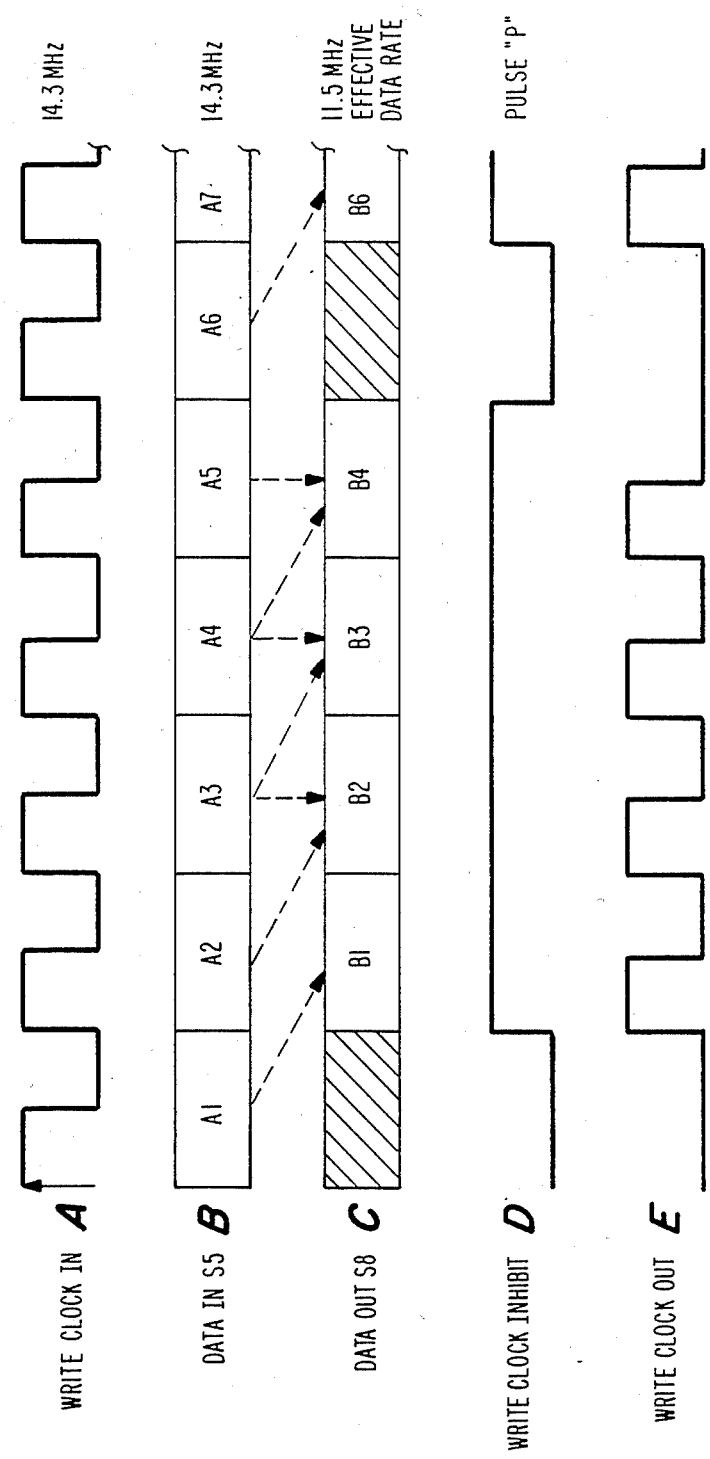
Figure 5:
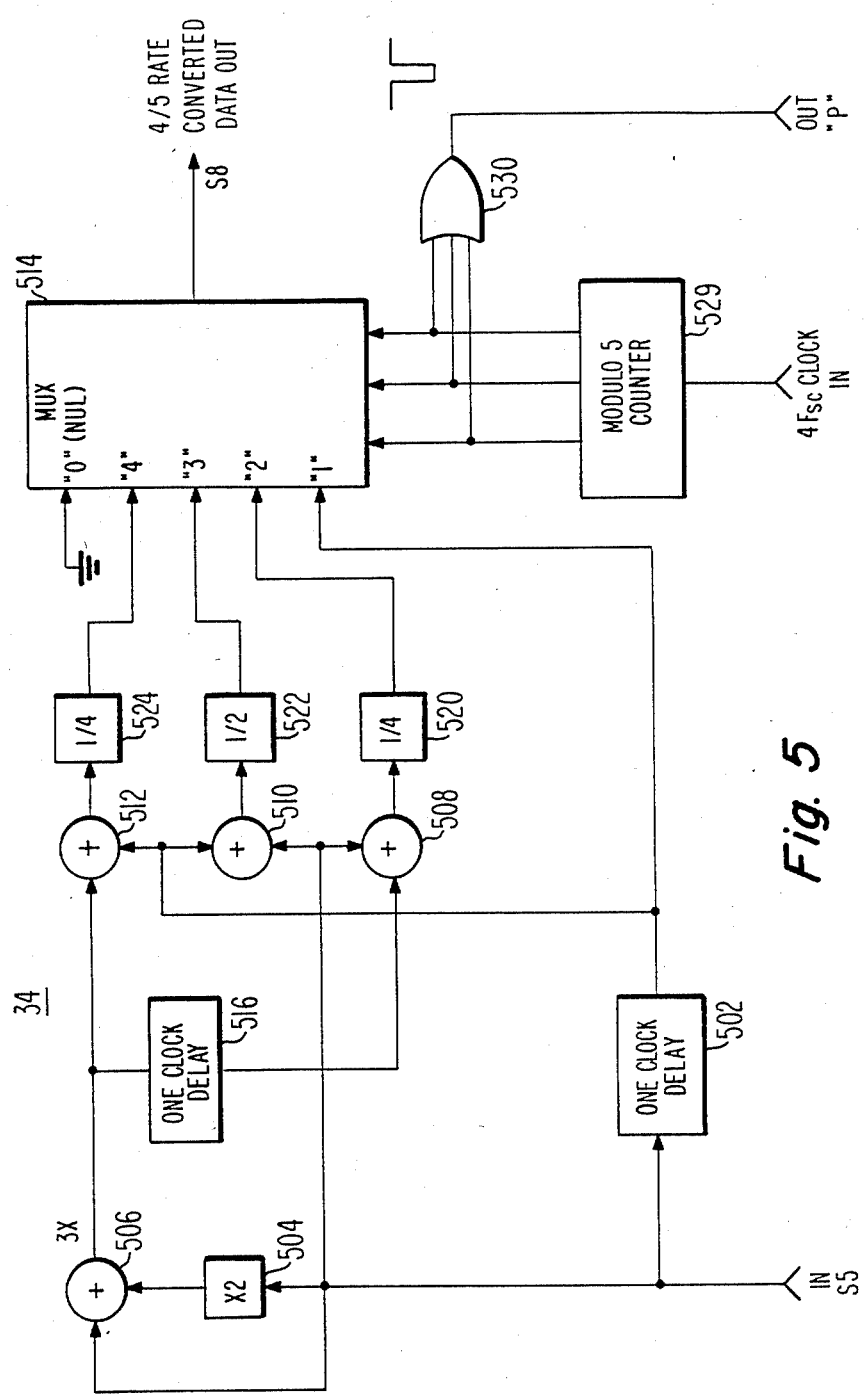
FIG. 5 is a detailed block diagram of a portion of the receiver/monitor of FIG. 1.

Converter 34 is a data rate converter that reduces the data rate of signal S5 by a factor of 5-to-4 to provide a rate reduced video signal S8 having an effective data rate of about 11.5 MHz (as hereinbefore defined) but having a clock rate of 14.3 MHz as will be explained below. A converter which alters the effective data rate without changing the clock rate is illustrated in FIG. 5 and described subsequently. FIG. 4 illustrates the principle involved. The input signal S5 (waveform B) comprises 14.3 MHz pixel words synchronous with the 4Fsc clock (waveform A). For each five input pixels A1–A5, converter 34 generates four output pixels B1–B4 and a "null" or blank pixel (cross-hatched). Pixel B1 equals pixel A1 delayed by one clock period. Pixels B2–B4 are interpolated from pixels A2–A5 as shown. Since four pixels are produced for each five pixels of signal S5, the effective data rate after conversion is 4/5 of the input data rate. Since each group of four output pixels is separated by a null pixel, the output clock rate is exactly the same as the input data rate (14.3 MHz).

The rate conversion of unit 34 advantageously allows operation of the memories (36 and 38) which provide video speed-up (i.e., time compression and line doubling) at a read clock rate that is equal to twice the write clock rate. Note that in a conventional line-doubling proscan system the memory of the read clock frequency is double the write clock frequency to provide 2:1 video time compression. One might suspect that a clock frequency ratio of 2.5:1 would be required to provide compression of 2.5:1. Unit 34, in accordance with a feature of the present invention, allows the use of conventional 2:1 related read and write clock frequencies to be used in obtaining 2.5:1 video compression thereby avoiding the need for very high frequency read clock signal (e.g., 10 Fsc) which otherwise would be needed to obtain 2.5:1 compression. Moreover, the read clock signal at 8 Fsc in timing unit 32 may be obtained in the conventional manner by simply doubling the write clock signal frequency. The eliminates the need for separate phase locked loops for generating clock signals related by a non-integer (2.5-to-1).

The rate converted signal S8 is alternately applied to memories 36 and 38 via a switch 40 which switches at the normal line scanning rate. A further line-rate operated switch 42 alternately couples the output of memories 36 and 38 to display 24 via D/A converter 29. Two further switches 44 and 46 apply read and write clock signals to memories 36 and 38, respectively, such that as one memory is being written at the 4 Fsc clock rate the other is read twice at the 8 Fsc clock rate. In a conventional pro-scan system this would time-compress the video signal by a factor of two and double the line rate. In the present system, however, the data stored in the memories has been rate converted by a factor of 5:4. What is stored, therefore is in effect a fore-shortened line of video. When the memory is read at double the normal (incoming) line rate the output signal is therefore compressed by a factor equal to the product of the clock ratio (2:1) and the rate conversion ratio (5:4) which equals 10:4 or a 2.5:1 net compression factor.

In order to avoid wasted memory space and the complication of skipping memory address locations containing the "null" pixels produced by converter 34, a AND gate 50 is interposed in the write clock line. As each null pixel appears (FIG. 4, waveform C) pulse "P" provided by unit 34 disables gate 50 (waveform D) thereby inhibiting every fifth pulse of the write clock (waveform E). Accordingly, null pixels are not stored in memories 36 and 38 and the memory capacity may be reduced by the rate conversion factor. As an example of this improved memory efficiency, an NTSC video signal sampled at 4 Fsc would normally have 910 pixels per line. In this example of the invention, unit 34 reduces the effective data rate by 20 percent. The four pixels (interpolated) are stored for each line received. This requires only 728 storage locations rather than 910 required in conventional pro-scan systems.

Since the video signal recovered from memories 36 and 38 is compressed by a factor greater than the horizontal line rate of display 24, clock switches 44 and 46 are provided with a "pause" (P) position to stop the memory read operation for 6.4 micro-seconds between read operations as illustrated in FIG. 2. This 6.4 microsecond read pause interval, in combination with the 4.4 micro-second blanking interval of the compressed video signal provides a total retrace time for display 24 of 10.8 micro-seconds which, as previously discussed, is substantially equal to the retrace time of the NTSC video input signal thereby reducing switching losses and reducing dv/dt stress on the output stage of horizontal drive unit 27.

Figure 3:
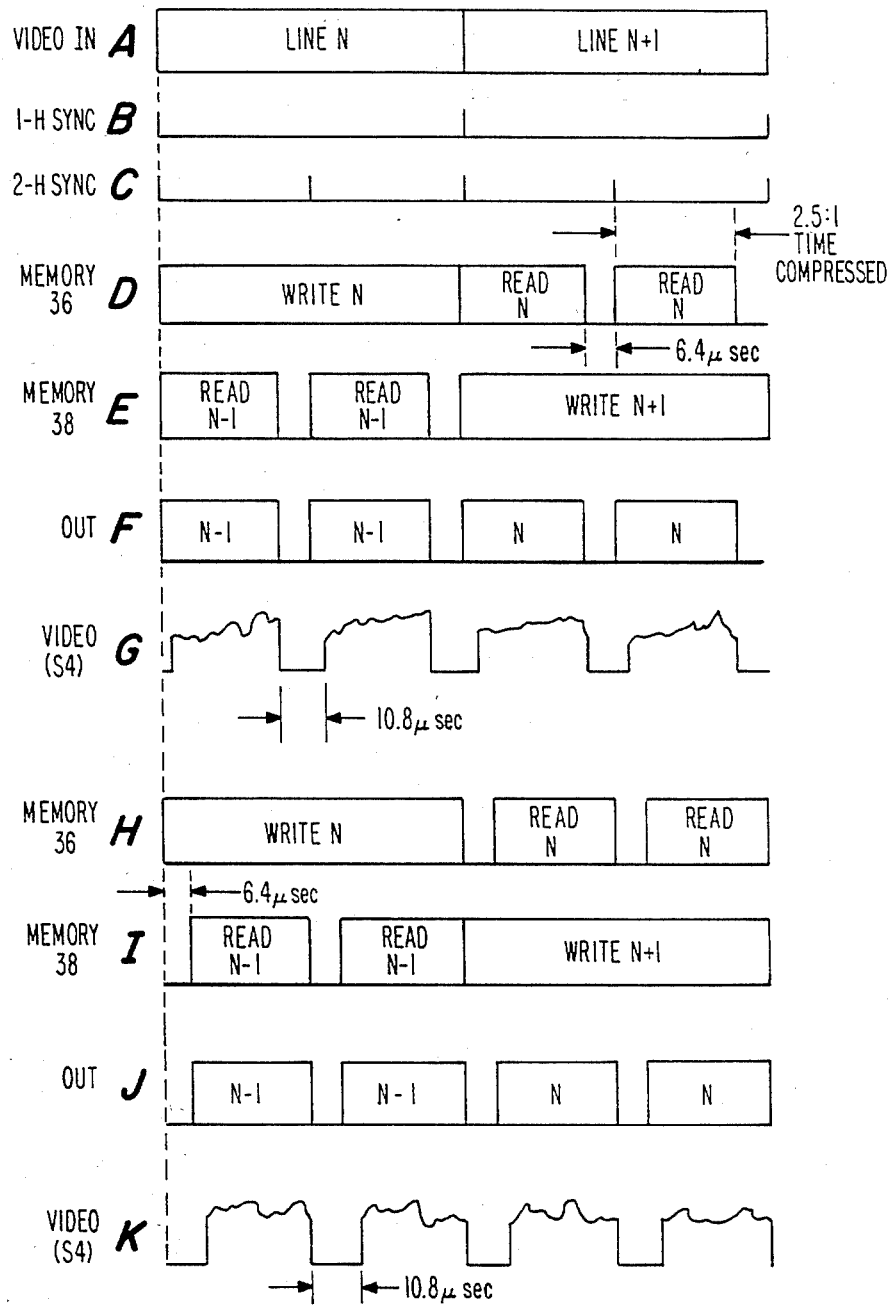

FIG. 3 provides a summary of the operation of processor 30 as two lines of video (N and N+1) are received (waveform A). Waveforms D-G illustrate operation where the clock switches are placed in the "read" position "R" coincident with 2-H sync timing of display 24 and placed in the pause position for 6.4 microseconds before the next 2-H sync pulse. Waveforms H-K are similar to waveforms D-G except that the 6.5 micro-second pause is performed immediately after the 2-H sync pulse. For either case, the result is the same, i.e., the total retrace time of the processed video signal S4 is 10.8 micro-seconds.

FIG. 5 is exemplary of a preferred implementation of rate converter 34. The 14.3 MHz video signal S5 is applied to a one clock period delay unit 502, to a times-two ($\times 2$) multiplier 504 and to adders 506–510. The output of unit 502 is signal S5 delayed by one clock cycle of the 14.3 MHz (4 Fsc) clock and is applied to adders 510 and 512 and to the "1" input of a multiplex switch 514. The output of adder 506 is signal S5 multipled by 3 (i.e., 1+2) and is applied to adder 512 and via a further one clock delay unit 516 to adder 508. The outputs of adders 508, 510 and 512 are coupled via dividers 520, 522 and 524 (having scaling factors of $\frac{1}{4}$, $\frac{1}{2}$ and $\frac{1}{4}$) to the "2", "3", and "4" inputs of switch 514, the "0" input of which is grounded. Switch 514 is controlled by a modulo-five counter 529 clocked by the 4 Fsc clock. The count of zero is sensed by an OR gate 530 for generating the write clock inhibit pulse "P".

Referring to FIG. 3, at the count of zero switch 514 is in position zero thereby providing a "null" output signal for signal S8 and gate 530 is disabled (output low) thereby providing the write clock inhibit pulse "P" which disables AND gate 50 to prevent storage of the null data byte (8 bit bytes are assumed) in memory 36 (or 38). At a count of "1" switch 50 selects the output of delay unit 502 to provide byte (pixel) B1 which equals byte (pixel) A1 of signal S5 delayed by one clock cycle. At a count of "2" switch 50 selects the output of divider 520 corresponding to the linearly interpolated pixel B2 which equals (3A2+A3)/4. At positions "3" and "4" the output pixels B3 and B4 are produced which equal, respectively, (A3+A4)/2 and (A4+3A5)4 and the cycle repeats.

Figure 6:
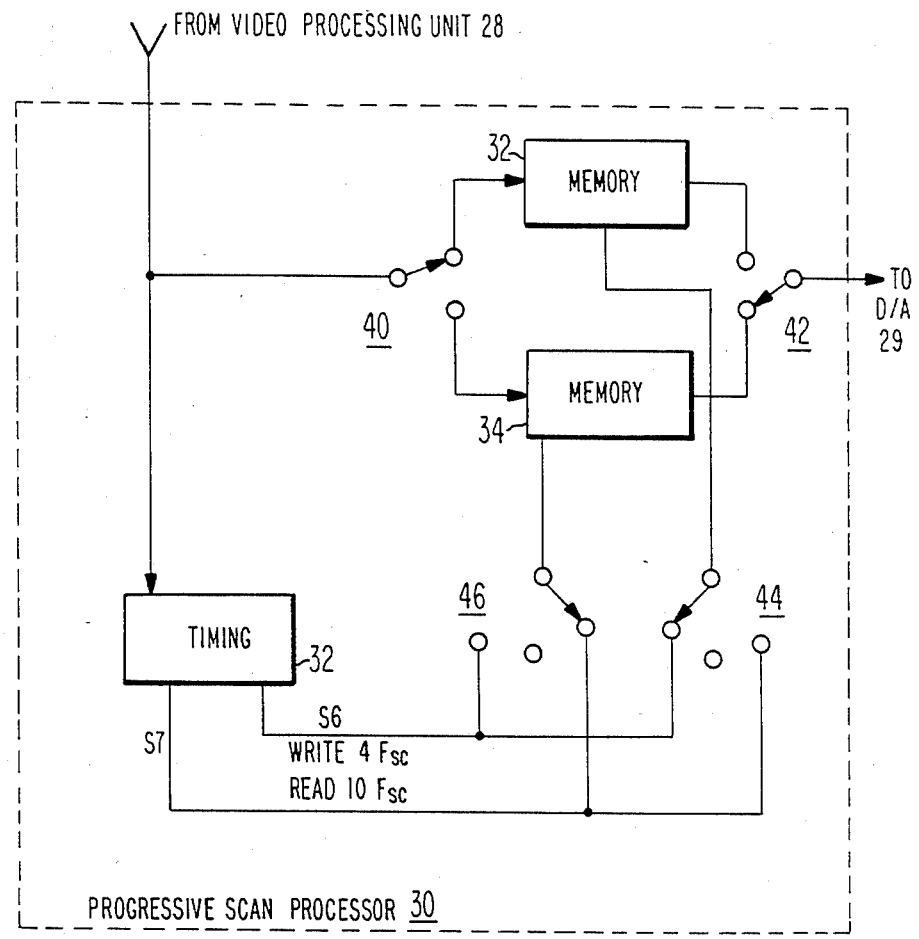
FIG. 6 is a block diagram illustrating a modification of the receiver/monitor of FIG. 1.

Processor 30 may be modified as shown in FIG. 6 in applications where the advantages of reduced memory storage requirements and integer related read/write clock signal frequencies are not desired. The modification comprises deleting rate converter 34 and AND gate 50 and modifying timing unit 32 to produce read/write clock frequencies related by the desired compression ratio of 2.5:1 (4 Fsc write, 10 Fsc read) In operation, the modified processor produces the same output signal format as shown in FIGS. 2 and 3 but at the expense of requiring 910 pixels of storage per memory (rather than 720) and a higher read clock frequency (35.8 Mhz rather than 28.6 MHz).

What is claimed is:

1. A television system, comprising:
   a source for providing a video input signal having a given line rate;
   processor means coupled to said source for time compressing said video input signal by a factor K and for increasing the line rate of the time compressed signal by a different factor N, K being greater than N, to provide a processed video output signal; and
   display means having a horizontal sweep rate equal to N-times said given line rate and coupled to said processor means for displaying said processed video output signal.

2. A television system as recited in claim 1 wherein the factors K and N are selected such that the horizontal retrace interval of said processed video output signal is substantially equal to that of said video input signal.

3. A television receiver as recited in claim 1 wherein said processor means comprises first converter means for converting said video input signal to digital form having a given clock rate and a given data rate and second converter means for changing said data rate without altering said clock rate.

4. A television system, comprising:
   a source having a given clock rate for providing a digital video input signal having a given line rate and a pixel rate equal to said given clock rate;
   rate converter means coupled to said source for converting said video input signal to a video output signal having a reduced number of pixels per line interspaced with null intervals so as to effectively reduce said pixel rate without changing said clock rate;
   memory means for storing said video output signal at said given clock rate and recovering the stored signal at a higher clock rate to provide a time compressed video output signal; and
   inhibiting means coupled to said memory means for preventing storage of said video output signal during said null intervals.

* * * * *